Figure 1:
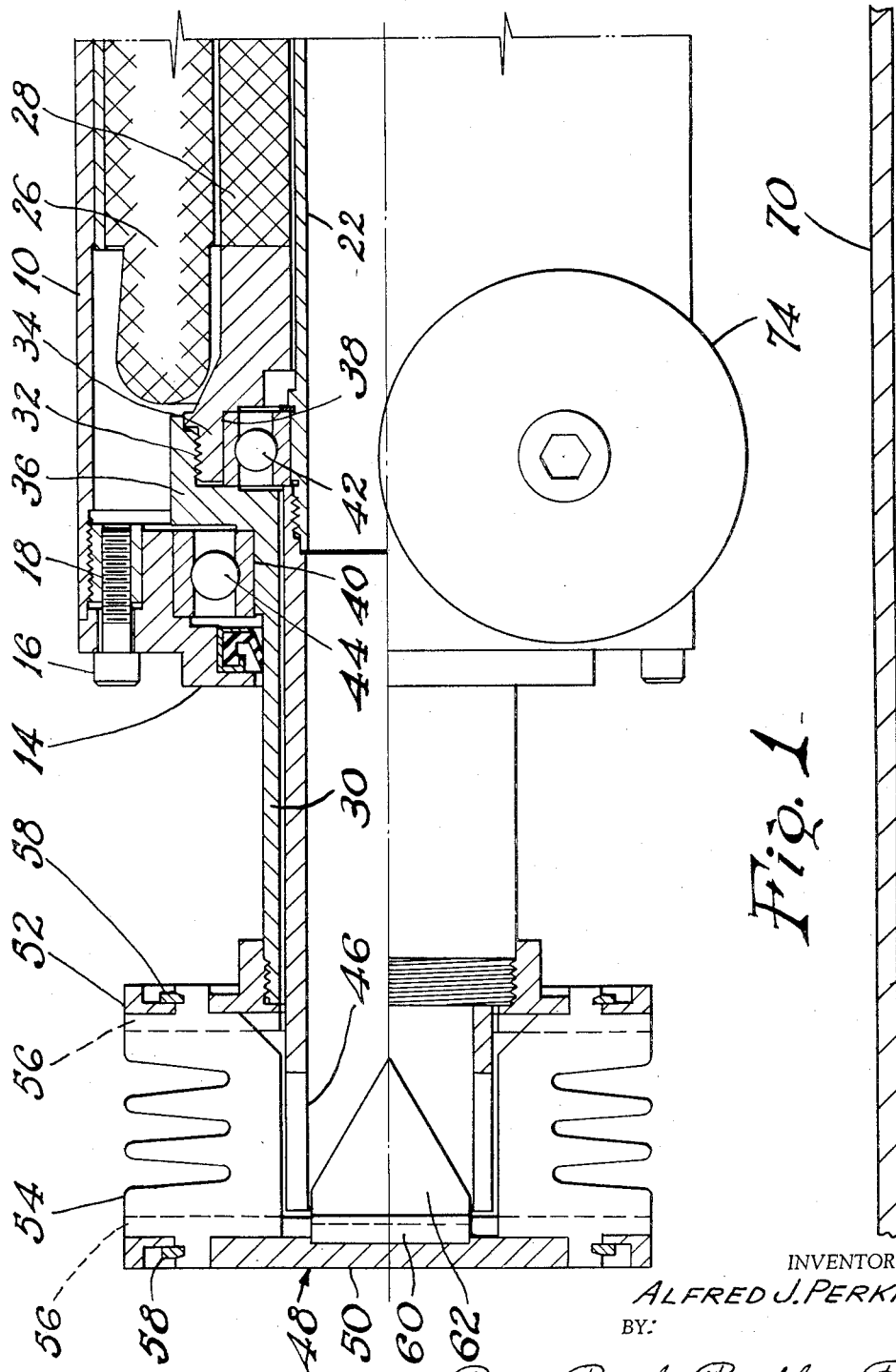

Dec. 23, 1958  A. J. PERKINS  2,865,322
PIPE LINING MACHINE
Filed Aug. 13, 1957  2 Sheets-Sheet 1

INVENTOR:
ALFRED J. PERKINS
BY:
Beau, Brooke, Buckley & Beau,
ATTORNEYS.

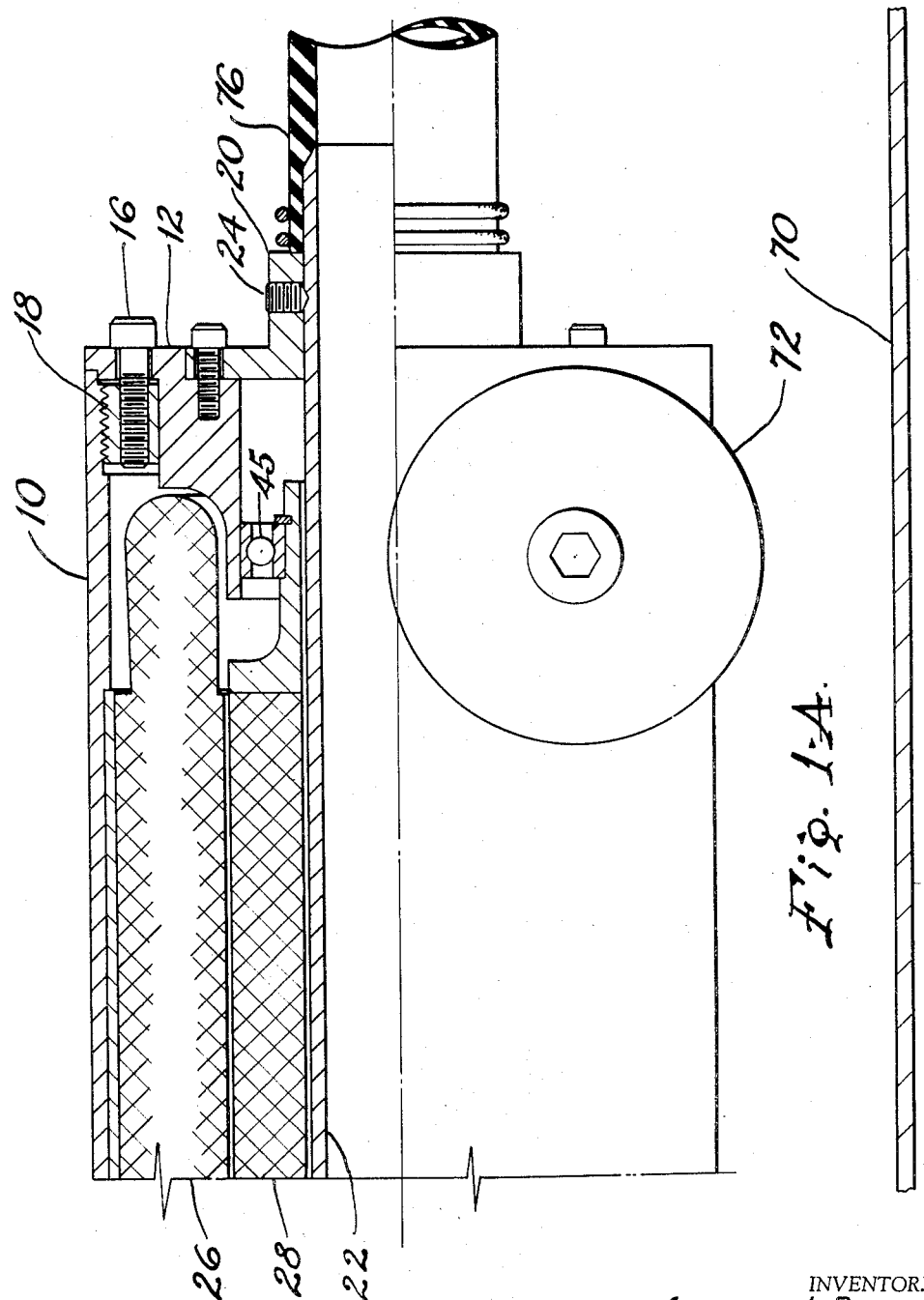

United States Patent Office 2,865,322
Patented Dec. 23, 1958

2,865,322

PIPE LINING MACHINE

Alfred J. Perkins, Lakeland, Fla., assignor to Perkins Pipe Linings, Inc., Grand Island, N. Y.

Application August 13, 1957, Serial No. 677,985

5 Claims. (Cl. 118—306)

This invention relates to apparatus for applying a lining of mortar or the like to the interior wall of a pipe, and more particularly to apparatus for applying such a lining to a pipe line of relatively small diameter in place in the ground.

Various forms of apparatus for applying a lining to a pipe in place in the ground have been known for many years, and more recently efforts have been directed to the provision of such apparatus for operation in small diameter pipe. One known form of machine for this purpose is the kind which comprises a rotary distributor head which applies the lining material to the pipe by centrifugal action as the device is advanced through the pipe line, the means for delivering the lining material to the distributor head including a flexible hose extending from the machine in the pipe to a pressure source of lining material at a point remote from the machine and usually above ground.

In apparatus of this type, the distributor head usually comprises coaxial rotor and stator parts having a small clearance therebetween and each mounted in an outboard manner beyond the rear end of the main body of the pipe lining machine which travels through the pipe, so as, to be in position to distribute the lining material centrifugally to the pipe wall clear of the machine. As efforts are made to provide smaller pipe lining machines for the lining of progressively smaller pipe lines, for example, pipe lines of 8 inch diameter, the provision of the required machine elements in such a small cross section becomes a serious problem and the overall shape of the machine becomes progressively elongated. With the elongation of the machine, the problem of providing adequate support for the relatively rotating outboard distributor head parts becomes a difficult one.

In accordance with the present invention, an improved mount and arrangement of parts is provided whereby a cross sectionally compact machine may be built wherein the machine, though elongate, is rugged and includes adequate support for the concentric rotating and non-rotating parts so as to maintain the desired close tolerances therebetween.

Accordingly, a major object of the invention is to provide an improved pipe lining applicator machine.

Another object of the invention is to provide an improved cross-sectionally small pipe lining applicator machine as aforesaid having a non-rotating lining material feed conduit which is mounted in a rugged and accurate manner within rotating parts of the machine.

Still another object of the invention is to provide a pipe lining machine as aforesaid wherein outboard lining material distributing head rotor and stator parts are maintained in accurate close alignment without supports such as would interfere with the free distribution of lining material from the head to the pipe or with the compactness of the machine.

Other objects of the invention will be apparent from the foregoing, as well as from the following detailed description, the claims, and from the drawings wherein:

Fig. 1 is an elevational view, partly in section, of the rear half of a pipe lining applicator machine embodying the invention; and Fig. 1A is a continuation of the showing of Fig. 1, illustrating in like manner the forward half of the machine.

Referring more particularly to drawings, a pipe lining applicator machine constituting a preferred embodiment of the invention is illustrated to comprise a cylindrical housing or frame 10 having end walls 12, 14 mounted by screws 16 in end rings 18, 18 threadedly engaged in the opposite ends of the tubular housing wall. One end wall 12 includes a boss member 20 in which a lining material feed conduit or pipe 22 is fixedly mounted, as by a set screw 24. Mounted inside the housing 10 is a hollow center or so called "can" type electric motor having a stator 26 carried by the housing 10 and a rotor 28 therewithin annularly encircling the feed pipe 22.

The motor rotor 28 has a hollow output shaft 30 threadedly carried thereby at 32, this threaded connection being at outwardly flared portions 34, 36 of the motor rotor and its output shaft, so as to provide inwardly and outwardly facing grooves 38, 40 which accommodate bearings 42, 44 mounting the pipe 22 on the rotor 28 and the rotor assembly 22, 30 on the adjacent end wall 14 of the housing 10, respectively. The amount of the rotor is completed by a forward bearing 45 carried by the forward end wall 12 of the machine frame.

As shown, the feed conduit or pipe 22 extends past its support at the bearing 42, within the output shaft 30 outboard of the end wall 14, and ends in a distributor head stator portion, in the illustrated machine comprising a plurality of lateral ports 46 through which the lining material is extruded.

Cooperative with the distributor head stator 46, a distributor head rotor 48 is provided which comprises a pair of end walls 50, 52 which mount radial vanes 54 in slots 56 in the end walls, the vanes being retained by snap rings as shown at 58, 58. Also as shown, the outboard distributor head end wall 50 mounts a circular plate 60 as a part thereof, the plate 60 closing the end of the feed conduit 22 and mounting an agitator vane or plate 62 which projects axially into the stator 46 to aid directing the mortar or other lining material outwardly therethrough.

In the form shown, the machine is supported in and coaxially with the pipe 70 to be lined by forward and aft wheels 72, 74 and is drawn through the pipe in any suitable manner, as by a hose connection 76 which also makes a connection to a suitable source of lining material, such as a remote pump (not shown) for supplying lining material under pressure to the feed conduit 22.

From the foregoing it will be appreciated that ample support is provided for the lining material feed conduit and the rotary parts which embrace the same, in a compact manner which leaves the outboard parts completely free of supports which would interfere with their function while at the same time maintaining the close tolerances required between the distributor head stator portion 46 and the distributor head rotor portions 54, 60, 62.

While only one embodiment of the invention has been illustrated to describe in detail, it will be understood that the invention could be embodied otherwise within the spirit of the invention and the scope of the appended claims.

What is claimed is:

1. In a pipe lining apparatus adapted to travel through a pipe while applying a lining to the interior thereof, a lining applicator machine comprising a generally cylindrical frame having ring-shaped first and second transverse end walls at its opposite ends, means for supporting said frame in said pipe to be coaxial therewith, a lining material feed conduit extending through and supported by said first end wall to extend coaxially with said frame through the same and outboard of said second end wall, the outboard portion of said conduit ending in and supporting a lining material distributor head stator portion, a hollow center motor within said frame and annularly embracing said conduit, said motor comprising a stator mounted by said frame and a hollow rotor journaled at one end by a first bearing on said first end wall and at its other end by a second bearing on said conduit, a hollow output shaft connected to said motor rotor as an extension thereof and extending through said second end wall in embracing relation to said outboard portion of said conduit, third bearing means journaling said shaft in said second end wall, and a lining material distributor head rotor mounted by said shaft in embracing cooperative relation to said distributor head stator portion, the joint of said motor rotor to said shaft being radially enlarged to provide an internal annular groove mounting said second bearing, whereby the motor rotor and shaft assembly is journaled at spaced positions on said frame, and said conduit is supported at similarly spaced positions at said first end wall and at said second bearing for maintaining the outboard distributor stator and rotor parts in proper alignment.

2. In a pipe lining apparatus adapted to travel through a pipe while applying a lining to the interior thereof, a lining applicator machine comprising an elongate frame and means for supporting said frame in said pipe, a lining material feed conduit supported by the forward end of said frame to extend therethrough coaxially with said pipe and outboard of the rear end of said frame, the outboard portion of said conduit ending in and supporting a lining material distributor head stator portion, a hollow center motor within said frame and annularly embracing said conduit, said motor comprising a stator mounted by said frame and a hollow rotor journaled at its forward end by a first bearing to be supported by said frame and journaled by a second bearing on said conduit at a position spaced rearwardly of said first bearing, third bearing means journaling said motor rotor in the rear end portion of said frame, said motor rotor comprising a hollow output shaft portion as an extension thereof projecting in embracing relation to said outboard portion of said conduit, and a lining material distributor head rotor mounted by said shaft portion in embracing cooperative relation to said distributor head stator portion, whereby the motor rotor is journaled at spaced positions for support by said frame, and said conduit is supported at similarly spaced positions at the forward end of said frame and at said second bearing for maintaining the outboard distributor stator and rotor parts in proper alignment.

3. In a pipe lining apparatus adapted to travel through a pipe while applying a lining to the interior thereof, a lining applicator machine comprising an elongate frame and means for supporting said frame in said pipe, a lining material feed conduit supported by the forward end of said frame to extend therethrough coaxially with said pipe and outboard of the rear end of said frame, the outboard portion of said conduit supporting at its outer end a first lining material distributor head portion, a hollow center motor within said frame and annularly embracing said conduit, said motor comprising a stator mounted by said frame and a hollow rotor journaled at its forward end by a first bearing to be supported by said frame and journaled by a second bearing on said conduit at a position spaced rearwardly of said first bearing, third bearing means journaling said motor rotor in the rear end portion of said frame, said motor rotor comprising a hollow output shaft portion as an extension thereof projecting in embracing relation to said outboard portion of said conduit, and a second lining material distributor head portion mounted by said shaft portion in cooperative relation to said first distributor head portion, whereby the motor rotor is journaled at spaced positions for support by said frame, and said conduit is supported at similarly spaced positions at the forward end of said frame and at said second bearing for maintaining the outboard distributor head portions in proper alignment.

4. In a pipe lining apparatus adapted to travel through a pipe while applying a lining to the interior thereof, a lining applicator machine comprising a generally cylindrical frame having ring-shaped first and second transverse end walls at its opposite ends, means for supporting said frame in said pipe to be coaxial therewith, a lining material feed conduit extending through and supported by said first end wall to extend coaxially with said frame through the same and outboard of said second end wall, the outboard portion of said conduit ending in and supporting a lining material distributor head stator portion, a hollow center motor within said frame and annularly embracing said conduit, said motor comprising a stator mounted by said frame and a hollow rotor journaled at one end by a first bearing on said first end wall and at its other end by a second bearing on said conduit, a hollow output shaft connected to said motor rotor as an extension thereof and extending through said second end wall in embracing relation to said outboard portion of said conduit, third bearing means journaling said shaft in said second end wall, and a lining material distributor head rotor mounted by said shaft in embracing cooperative relation to said distributor head stator portion, the joint of said motor rotor to said shaft being radially enlarged to provide an internal annular groove mounting said second bearing and an external annular groove next thereto mounting said third bearing, whereby the motor rotor and shaft assembly is journaled at spaced positions on said frame, and said conduit is supported at similarly spaced positions at said first end wall and at said second bearing for maintaining the outboard distributor stator and rotor parts in proper alignment.

5. In a pipe lining apparatus adapted to travel through a pipe while applying a lining to the interior thereof, a lining applicator machine comprising an elongate non-rotating structure and means for supporting said structure in said pipe, said structure comprising a lining material feed conduit portion supported by its forward end to extend rearwardly coaxially with said pipe, said structure comprising also a frame portion external of said conduit portion, a hollow center motor within said structure and annularly embracing said conduit portion, said motor comprising a stator mounted by said structure and a hollow rotor journaled at its forward end by a first bearing on said structure and journaled by a second bearing on said conduit portion at a position spaced rearwardly of said first bearing, and third bearing means journaling said motor rotor on said frame portion at a position spaced rearwardly of said first bearing, said motor rotor comprising a hollow output shaft portion as an extension thereof projecting in embracing relation to the rear end portion of said conduit portion, whereby the motor rotor is journaled at spaced positions for support by said structure, and said conduit portion is supported at similarly spaced positions at the forward end of said structure and at said second bearing.

References Cited in the file of this patent
UNITED STATES PATENTS

| | | |
|---|---|---|
| Re.11,899 | Newman et al. | Mar. 26, 1901 |
| 680,804 | Newman et al. | Aug. 20, 1901 |
| 2,303,088 | Perkins | Nov. 24, 1942 |
| 2,326,823 | Brend | Aug. 17, 1943 |